(12) United States Patent
Cliff et al.

(10) Patent No.: US 8,887,880 B2
(45) Date of Patent: Nov. 18, 2014

(54) SIMPLIFIED COOLING CIRCUIT FOR POWERTRAIN BRAKING SYSTEM

(75) Inventors: Michael J. Cliff, Coffeyville, KS (US); Robert L. Wood, Jr., Independence, KS (US); Briton T. Eastman, Coffeyville, KS (US); Poongundran Ganapathi, Coffeyville, KS (US)

(73) Assignee: Deere & Company, Moline, IL (US)

( * ) Notice: Subject to any disclaimer, the term of this patent is extended or adjusted under 35 U.S.C. 154(b) by 1011 days.

(21) Appl. No.: 12/476,661

(22) Filed: Jun. 2, 2009

(65) Prior Publication Data

US 2010/0300776 A1 Dec. 2, 2010

(51) Int. Cl.
*F16D 65/833* (2006.01)
*F16D 65/853* (2006.01)
*F16D 69/00* (2006.01)
*F16D 121/02* (2012.01)

(52) U.S. Cl.
CPC ........ *F16D 65/853* (2013.01); *F16D 2069/004* (2013.01); *F16D 2121/02* (2013.01)

USPC ..................................................... 188/264 D

(58) Field of Classification Search
USPC ...... 188/264 B, 264 D, 71.6, 264 R, 264 CC, 188/264 F
See application file for complete search history.

(56) References Cited

U.S. PATENT DOCUMENTS 4,661,083 A * 4/1987 Heidenreich et al. ........... 464/17
6,189,669 B1 * 2/2001 Kremer et al. ............. 192/70.12
6,206,163 B1 * 3/2001 Schneider ................ 192/113.35

* cited by examiner

*Primary Examiner* — Vishal Sahni
(74) *Attorney, Agent, or Firm* — Quarles & Brady LLP

(57) ABSTRACT

An efficient lubrication system for wet plate brake assemblies includes a flow control system that passes lubricant for cooling and lubrication through interdigitated wet brake plates when the plates are engaged. When the plates are disengaged, the wet plate assembly is controlled to limit its displacement by means of a pin and spring such that a gap is provided around the brake plates to provide a preferential path for lubricant, thus minimizing parasitic losses.

20 Claims, 3 Drawing Sheets

SIMPLIFIED COOLING CIRCUIT FOR POWERTRAIN BRAKING SYSTEM

BACKGROUND OF THE INVENTION

1. Field of the Invention

The present invention relates to powertrains of work machines, and, more specifically, to integrated braking systems for such machines.

2. Description of the Related Art

For many years, work machines have incorporated brake assemblies within their powertrain and, more specifically, adjacent the torque-carrying shafts spaced from the wheels for such vehicles. Typically, these brake assemblies comprise a series of interdigitated annular plates that are respectively connected to a housing in which they are positioned and to a torque-carrying power shaft. The brake assemblies are activated by an external piston that forces the brake disc plates together to provide a retarding force between the housing and the torque-carrying shaft. Because the friction plates are positioned within the housing, a system for lubricating the plates and for dissipating excess heat must be employed. Typically, such cooling system includes a pump recirculating powertrain lubricant through a heat exchanger and through the friction plates for the unit.

In recent years, there has been an increased emphasis on minimizing parasitic losses within the entire system of a work machine. For such a machine, it has been proposed to vary the amount of coolant and lubricant flowing through the friction plates so as to minimize heat generated by the assembly.

In the past, it has been proposed to control the flow through the friction plates by means of a valve and a control system with logic sensing when the clutch plates are disengaged to minimize the lubricant flow through the assembly. While this is one attempt to minimize the expenditure of energy, it requires a complicated set of hardware and of control logic to achieve the end.

What is needed in the art, therefore, is a cooling system for the brake assembly of a powertrain that minimizes and simplifies the function of reducing lubricant flow during disengaged operation.

SUMMARY OF THE INVENTION

In one form, the invention includes a powertrain assembly with an integral brake assembly, the powertrain assembly including a housing and a torque-carrying power shaft. A brake assembly includes interdigitated annular friction plates respectively connected to the housing and to the torque-carrying power shaft. A liquid lubricant and cooling circuit provides liquid between the annular friction plates for distributing liquid between the annular friction plates when the plates are engaged with one another and around and through the annular friction plates when the plates are disengaged as a function of the displacement of said friction plates relative to one another and to said housing for reducing parasitic losses when the brake assembly is not engaged.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
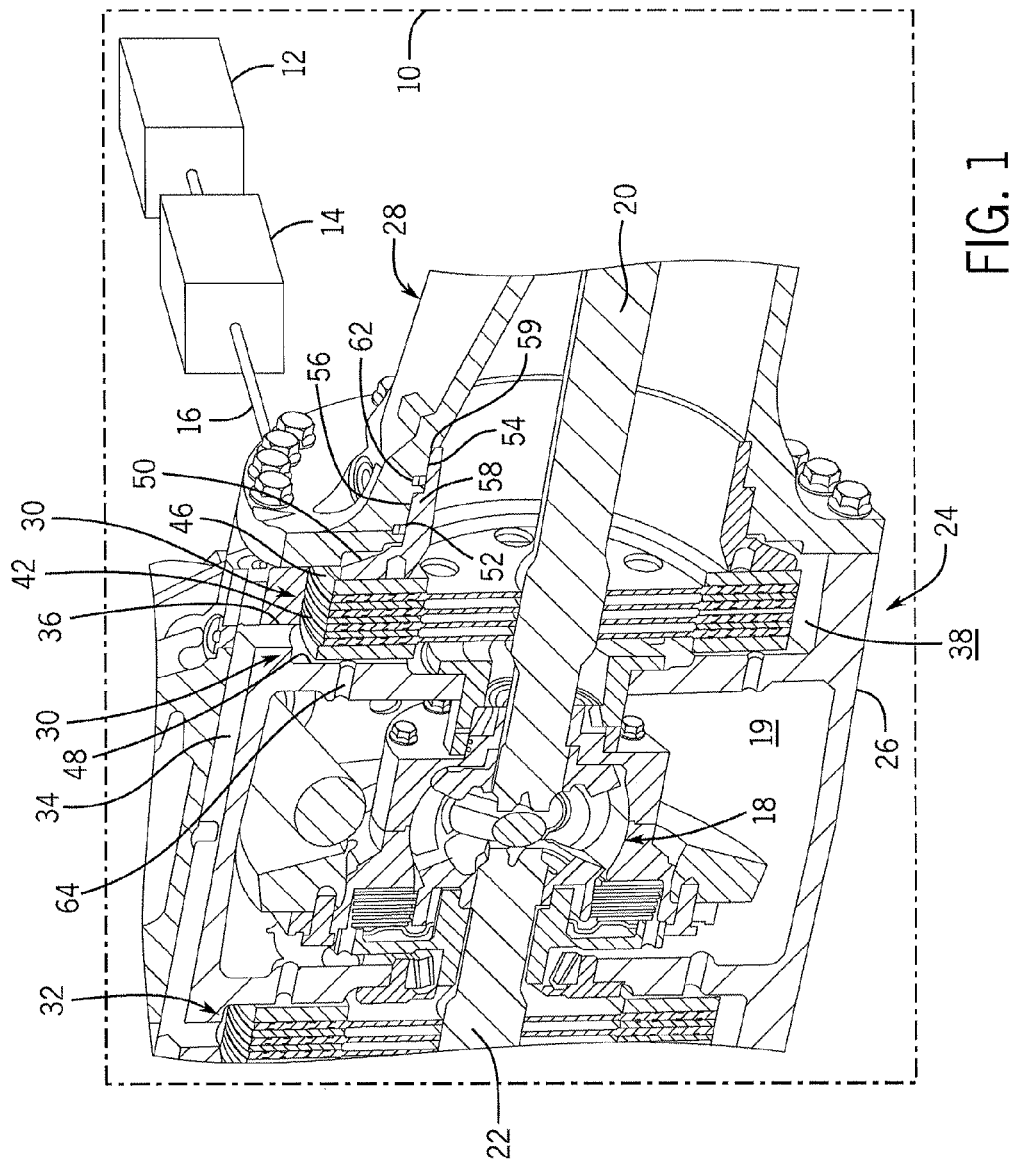
FIG. 1 is a perspective view of a work machine incorporating a powertrain with a brake cooling assembly embodying the present invention.

Referring now to the drawings, and more particularly to FIG. 1, there is shown a work machine 10 having a prime mover 12 which may be a diesel engine mechanically interconnected to a transmission 14 and an input shaft 16 extending to a differential 18 powering right and left shafts 20 and 22 respectively. Shafts 20 and 22 are torque-carrying and are contained within a housing 24 and extend to driving wheels (not shown) for work machine 10. Shafts 20 and 22 may also power epicyclic gear reduction assemblies (also not shown) adjacent the wheels to provide vehicle velocity control.

The housing 24 contains a central housing 26, generally annular in form, which provides a support and journaling for all of the interior elements and right and left extensions 28 for journaling and housing axles 20 and 22. The central housing 26 encompasses a chamber 19 for the differential 18 and provides a sump for lubrication and cooling fluid to be described later.

Each of the axles 20 and 22 are selectively braked by brake assemblies 30 and 32, respectively. Brake assemblies 30 and 32 are substantially identical so that only brake assembly 30 will be discussed to simply the description of the present invention.

Brake assemblies 30 and 32 are a wet plate design so that they are fed with lubricant for cooling and lubricant purposes from a pump (not shown) through passages 34 and 36 in central housing 26, leading to a chamber 38 in which a plurality of interdigitated annular friction plates are positioned. The friction plates are annular plates 42 and 40 respectively secured to the housing 26 and to the shaft 20. Annular plates 42 are connected to the housing 26 by appropriate interconnections (not shown to simplify the understanding of the present invention) that keep the plates 42 from rotating within housing 26 but permit axial movement within chamber 38. Annular friction plates 40 are appropriately connected to torque-carrying power shaft 20 by means of a splined connection on shaft 20 to cause the plates 40 to rotate with shaft 20 but permit limited axial movement with chamber 38. Friction plates 40 and 42 may be formed with appropriate materials and configuration to produce maximum braking effect when engaged while at the same time providing extended service life.

The interdigitated annular friction plates 40 and 42 have annular end plates 44 and 46, also contained within housing 38. Plate 44 is adjacent a wall 48 of chamber 38 and end plate 46 is adjacent an annular pusher plate 50 received within housing extension 28 and displaceable in an axial direction to press against the end plate 46 and cause the friction plates 40, 42, and end plate 44 to engage one another and for end plate 44 to abut wall 48.

Annular pusher plate 50 is received within bores 52 and 54 of housing extension 28, separated by a shoulder 56. Pusher plate has a corresponding shoulder 58 that abuts shoulder 56 when the pusher plate 50 is in its right most position. Appropriate seals 62 seal the chamber and pressurized fluid is introduced to the chamber to expand the axial distance between the shoulders 56 and 58 to move pusher plate 50 in a direction to the left as shown in FIG. 1 to cause the annular friction plates 40 and 42 to interengage one another and to provide a retarding force between housing 26 and the shaft 20.

The flow of lubricant through port 36 passes from the exterior of the annular friction plates 40 and 42 and through appropriate recesses in the plates (not shown) to flow radially inward to finally exit the pack of friction plates adjacent shaft 20 and into the chamber 19 for differential 18.

In accordance with the present invention, the plates 40 and 42 and corresponding end plates 44 and 46, when in the disengaged position, are displaced so as to provide a gap between end face 48 and the interdigitated friction plates, specifically with end plate 44. This gap permits flow of lubricant from passage 34 and port 36 preferentially through a port 64 extending into the chamber 19 for the differential 18. The flow from port 36 may also flow through the interdigitated friction plates 40 and 42 to exit into the chamber for differential 18 adjacent shaft 20, but the path of least resistance is from port 36, past end plate 44 through port 64. This preferential path during disengagement of the brake assembly 30 greatly minimizes the parasitic pumping losses when the brake assemblies are disengaged. It has been found that a gap of at least as small as approximately 1 mm between end wall 48 and end plate 44 produces enhanced flow conditions for minimizing parasitic losses.

Figure 2:
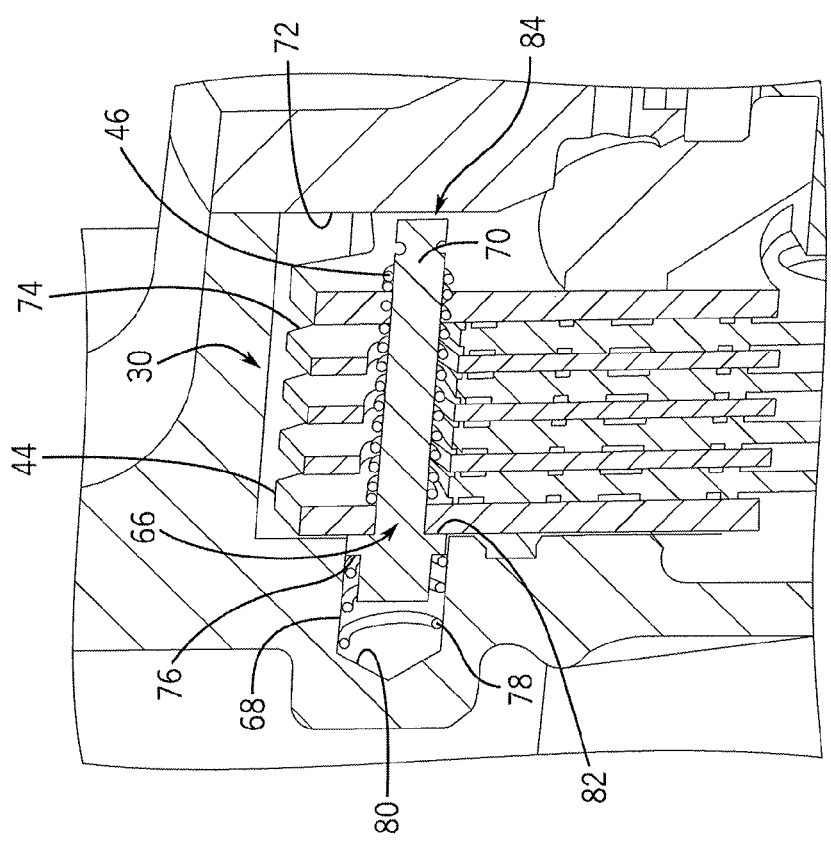
FIG. 2 is an expanded perspective view of a portion of the brake assembly showing the manner in which the clearance between the brake assemblies is maintained during disengagement.

The mechanism in FIG. 2 provides a means for the clearance between end wall 48 and end plate 44 to be maintained during disengagement of the brake assembly 30. A pin 66 is received within a bore 68 and has a first portion 70 extending through the brake assembly 30 to adjacent an opposite wall 72. The first portion 70 has a spring 74 telescoped over it to yieldably act against end plate 44 and 46 to expand the friction plates relative to one another in the absence of an external force. The portion of the pin 66 received within bore 68 has a shoulder 76 against which a spring 78 abuts and acts, also against an end wall 80 of bore 68. The spring constant of spring 78 is stronger than the spring force of spring 74. Thus, when pusher plate 50 is displaced to the left as shown in FIG. 2, it overcomes the spring force of both spring 74 and 78 to cause the interdigitated plates 40, 42 to abut one another and provide a retarding force. When the fluid force is released from pusher plate 50, the spring 74 causes the friction plates assembly to expand but, since the spring force of spring 78 is greater, the pin 66 pushes end plate 44 away from surface 48 through shoulder 82 and against and towards opposite wall 72. The length of pin 66 is selected so that when end face 84 of pin 66 abuts surface 72, the selected dimension of the gap between surface 48 and end plate 44 is achieved.

Figure 3:
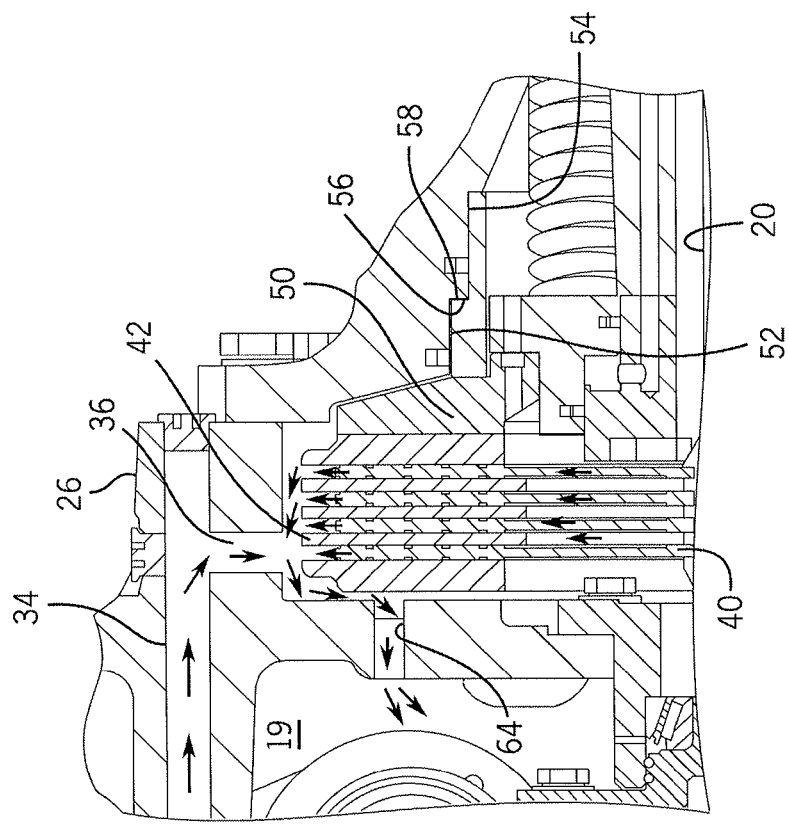
FIG. 3 is a cross-sectional view showing the cooling circuit flow of a system of FIG. 1 in the engaged position.
Figure 4:
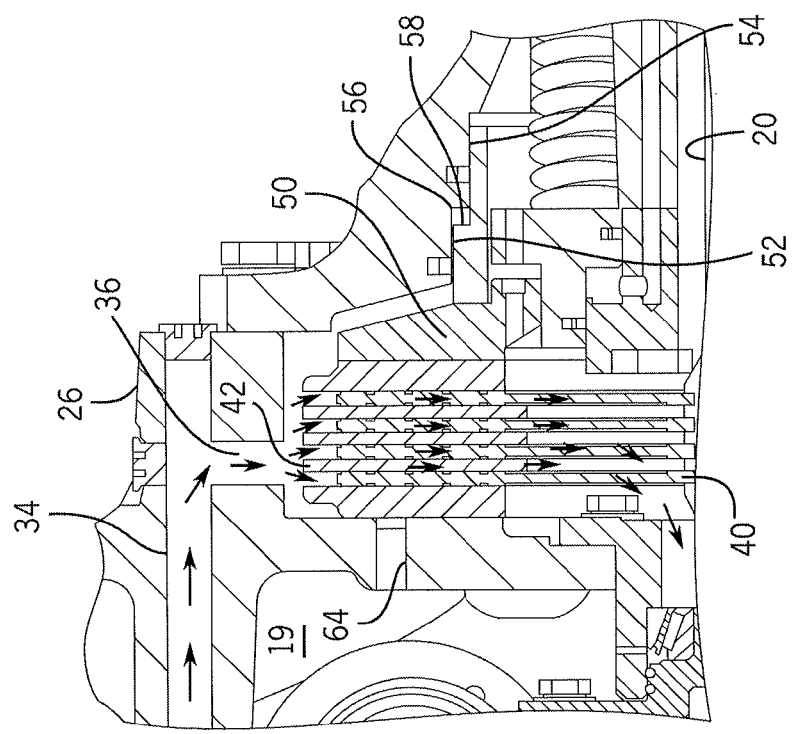
FIG. 4 is a cross-sectional view showing the brake assembly of FIG. 3 in the position wherein the brakes are disengaged.

Referring to FIGS. 3 and 4, the flow of lubricant to the brake assembly 30 is illustrated. In FIG. 3, the pressure plate 50 is in its left most position forcing the friction plates 40, 42 and end plates 44, 46 together and against wall 48. In this position, the brake assembly 30 provides a retarding force to shaft 20 and the flow of lubricant is indicated by the arrows is through port 36 through the plates 40, 42 and exits adjacent shaft 20 to enter the chamber 19 for the differential 18. When the pressure between the shoulder 56 and pusher plate shoulder 58 is released, spring 74 expands the friction plates 40, 42 and, more importantly, the spring 78 causes the end plate 44 to be displaced from end wall 48 so that the flow of fluid from port 36 is preferentially between end plate 44 and wall 48 to exit through port 64 to the chamber 19 for differential 18. Because there are existing flow passages between the plates 40 and 42 and they are spaced from one another, liquid is permitted to flow through the pack. However, a majority of the flow is past the end plate 44 and into the chamber 19. Centrifugal force between the rotating plates may also cause a reversal of liquid to the periphery of the brake assembly and thus through port 64 to the chamber 19 for differential 18. Oil also enters the interior of housing 28.

The arrangement described above permits an extremely simplified and effective way in which lubricant can be bypassed around a brake assembly during disengagement so as to significantly minimize the parasitic losses caused by pumping fluid to a high pressure and passing it through the flow resistance of abutting friction plates. This function is achieved without the need for complicated valve control and control logic to determine when the brakes are engaged or disengaged. As such, the reliability of this system is enhanced significantly relative to prior art devices and, at the same time, reduces cost of the overall system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A powertrain assembly including an integral brake assembly, said powertrain assembly comprising:
   a housing defining a brake chamber having a first port and a second port;
   a torque carrying power shaft;
   a brake assembly disposed in said brake chamber and having interdigitated annular friction plates, including an end plate, said friction plates respectively connected to said housing and to said torque carrying power shaft; and
   a liquid lubricant and cooling circuit for providing liquid flow from said first port into said brake chamber, wherein, in an engaged position of said brake assembly, said second port is closed by said end plate to prevent flow of said liquid through said second port and said liquid flows through said first port into said brake chamber and between said friction plates, and wherein, in a disengaged position of said brake assembly, said second port is open to said first port such that at least some of said liquid flows through said first port into said brake chamber, between said housing and said friction plates, and through said second port out of said brake chamber without passing between said fiction plates themselves so as to reduce parasitic losses when said brake assembly is not engaged.

2. The powertrain assembly as claimed in claim 1, wherein said friction plates have an outside diameter and an inside diameter and the flow of said liquid between said friction plates is from the outside diameter to the inside diameter.

3. The powertrain assembly as claimed in claim 1, wherein in said disengaged position of said brake assembly said end plate is spaced from said housing to provide clearance between said end plate and said housing for passage of said liquid into said second port.

4. The powertrain assembly as claimed in claim 3, wherein said end plate is spaced from said housing by at least approximately 1 mm when said brake assembly is in said disengaged position.

5. The powertrain assembly as claimed in claim 1, wherein said housing has an end wall and said brake assembly includes an annular pusher element acting against said friction plates and urging them against said end wall of said housing to provide a retarding force during engagement of said brake assembly.

6. The powertrain assembly as claimed in claim 5, wherein said housing has an annular shoulder cooperating with a shoulder on said annular pusher element and pressurized therebetween to displace said pusher element against said friction plates to provide a retarding force during engagement of said brake assembly.

7. The powertrain assembly as claimed in claim 6, further comprising an element having an expansion spring to displace said friction plates during disengagement of said brake assembly.

8. The powertrain assembly as claimed in claim 7, wherein said element has a second spring with a spring force greater than a spring force of the expansion spring to maintain a clearance between said friction plates and said housing.

9. The powertrain assembly as claimed in claim 8, wherein said element includes a rod extending through an opening in each of said friction plates located between inside and outside diameters of the associated friction plate, said element having a length for abutting said housing to maintain said clearance between said friction plates and said housing.

10. A work machine, comprising:
a frame;
a prime mover mounted to said frame; and
a powertrain mounted to said frame and driven by said prime mover, said powertrain including:
    a housing defining a brake chamber having a first port, configured as a first opening in a first wall of the housing, and a second port, configured as a second opening in a second wall of the housing;
    a torque-carrying power shaft;
    a brake assembly disposed in said brake chamber and having interdigitated annular friction plates respectively connected to said housing and to said torque-carrying power shaft;
    a liquid lubricant and cooling circuit for providing liquid flow from said first port into said brake chamber, wherein, in a disengaged position of said brake assembly, a continuous liquid flow path is provided from said first port to said second port, via a clearance between said housing and said friction plates, such that at least some of said liquid flows through said first port into said brake chamber, between said housing and said friction plates, and through said second port out of said brake chamber without passing between said fiction plates themselves so as to reduce parasitic losses when said friction plates are not engaged, and wherein, in an engaged position of said brake assembly, said continuous liquid flow path between said first port and said second port is closed and said liquid flows through said first port into said brake chamber, and between said friction plates.

11. The work machine as claimed in claim 10, wherein said friction plates have an outside diameter and an inside diameter and the flow of said liquid between said friction plates is from the outside diameter to the inside diameter.

12. The work machine as claimed in claim 10, wherein in said disengaged position of said brake assembly said friction plates are spaced from said housing to provide said clearance between said housing and an endmost one of said friction plates for passage of said liquid through said clearance and through said second port out of said brake chamber.

13. The work machine as claimed in claim 12, wherein in said disengaged position of said brake assembly said friction plates are spaced from said housing and said friction plates are displaced relative to one another.

14. The work machine as claimed in claim 13, wherein said endmost one of said friction plates is spaced from said housing by at least approximately 1 mm when said brake assembly is in said disengaged position.

15. The work machine as claimed in claim 10, wherein said brake assembly includes an annular pusher element having one end pushing against said friction plates to urge them against a wall of said housing during engagement of said brake assembly.

16. The work machine of claim 10, wherein said housing has a shoulder cooperating with a shoulder on said pusher element and adapted to be pressurized to displace said pusher element against said friction plates to urge said friction plates against one another to brake said torque-carrying shaft during engagement of said brake assembly.

17. The work machine as claimed in claim 15, further comprising a spring-loaded element having a first spring to displace said friction plates during disengagement of said brake assembly.

18. The work machine as claimed in claim 17, wherein said spring-loaded element includes a second spring having a spring force greater than a spring force of said first spring to maintain said clearance between at least one end plate of said friction plates and said housing for passage of said liquid during disengagement of said brake assembly.

19. The work machine of claim 18, wherein said spring-loaded element includes a rod extending through an opening in each of said friction plates located between inside and outside diameters of the associated friction plate, said spring-loaded element having a length for setting said clearance between said end plates of said friction plates and said housing.

20. A powertrain assembly including an integral brake assembly, said powertrain assembly comprising:
    a housing defining a brake chamber, said housing including an inlet port for liquid flow into the brake chamber and an outlet port for liquid flow out of the brake chamber;
    a torque carrying power shaft;
    a brake assembly disposed in said brake chamber and having interdigitated annular friction plates respectively connected to said housing and to said torque carrying power shaft, each of said friction plates including an outer diameter and an inner diameter defining an annular portion of each of said friction plates;
    a brake assembly disposed in said brake chamber, said brake assembly including a pusher plate and interdigitated annular friction plates respectively connected to said housing and to said torque-carrying power shaft;
    a rod having a first portion and a second portion separated by a shoulder, said first portion of said rod extending through said annular portions of said friction plates, said second portion of said rod extending into a bore in the housing, and said shoulder engaging an end plate of said friction plates;
    a first spring seated on said first portion of said rod, said first spring engaging a plurality of said friction plates to urge said plurality of friction plates to expand relative to each other;

a second spring seated on said second portion of said rod, said second spring urging said rod out of said bore; and a liquid lubricant and cooling circuit for providing a flow of liquid through said inlet port into said brake chamber;

wherein, in a disengaged position of said brake assembly, said first spring expands said friction plates relative to each other and said second spring, via said shoulder, maintains a clearance between said end plate and said outlet port, a continuous liquid flow path being thereby provided from said inlet port, through said clearance, to said outlet port, whereby at least some of said liquid flows through said inlet port into said brake chamber and along said continuous liquid flow path from said inlet port, through said clearance, and through said outlet port out of said brake chamber; and wherein, in an engaged position of said brake assembly, said pusher plate urges said friction plates together, said end plate thereby compressing said first spring, via said shoulder, such that said clearance and said continuous liquid flow path between said inlet port and said outlet port are closed.

\* \* \* \* \*